(12) United States Patent
Hauck

(10) Patent No.: US 11,325,457 B2
(45) Date of Patent: May 10, 2022

(54) TRIPLE CLUTCH DEVICE AND DRIVETRAIN COMPRISING SUCH A TRIPLE CLUTCH DEVICE

(71) Applicant: BorgWarner Inc., Auburn Hills, MI (US)

(72) Inventor: Hans Juergen Hauck, Schwaebisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 147 days.

(21) Appl. No.: 16/689,165

(22) Filed: Nov. 20, 2019

(65) Prior Publication Data

US 2020/0164733 A1 May 28, 2020

(30) Foreign Application Priority Data

Nov. 24, 2018 (DE) ......................... 102018009253.5

(51) Int. Cl.
*B60K 6/387* (2007.10)
*F16D 21/06* (2006.01)
(Continued)

(52) U.S. Cl.
CPC ............... *B60K 6/387* (2013.01); *B60K 6/48* (2013.01); *F16D 21/06* (2013.01); *F16D 25/10* (2013.01);
(Continued)

(58) Field of Classification Search
CPC .. F16D 21/06; F16D 2021/0661; F16D 21/08; F16D 25/082; F16D 25/10;
(Continued)

(56) References Cited

U.S. PATENT DOCUMENTS

| 8,453,817 B2 | 6/2013 | Schrage |
| 2018/0231066 A1 | 8/2018 | Lorenz |

(Continued)

FOREIGN PATENT DOCUMENTS

| DE | 102009030135 A1 | 12/2010 |
| DE | 102012024699 A1 | 7/2013 |

(Continued)

OTHER PUBLICATIONS

Machine-assisted English language abstract for DE 10 2009 030 135 extracted from espacenet.com database on Dec. 18, 2019, 2 pages.

(Continued)

*Primary Examiner* — Richard M Lorence
(74) *Attorney, Agent, or Firm* — Howard & Howard Attorneys PLLC

(57) ABSTRACT

The present invention relates to a triple clutch device (2) for arrangement in a drivetrain of a motor vehicle having a double clutch device comprising a first disk clutch (40) for selective torque transmission between a first input-side disk carrier (52) and a first output-side disk carrier (54) and a second disk clutch (42) for selective torque transmission between a second input-side disk carrier (56), which is connected rotationally fixed to the first input-side disk carrier (52), and a second output-side disk carrier (58), and having a separating clutch device comprising a third disk clutch (44) for selective torque transmission between a third input-side disk carrier (60) and a third output-side disk carrier (62), wherein the first input-side disk carrier (52) is connected rotationally fixed to the third output-side disk carrier (62), and a first disk set (46) of the first disk clutch (40) and a third disk set (50) of the third disk clutch (44) are arranged nested in the radial directions (8, 10). The third disk set (50) is arranged within the first disk set (46) in the (Continued)

radial direction (10). The present invention additionally relates to a drivetrain of a motor vehicle comprising such a triple clutch device (2).

18 Claims, 1 Drawing Sheet

(51) Int. Cl.
*B60K 6/48* (2007.10)
*F16D 25/10* (2006.01)

(52) U.S. Cl.
CPC ............... *B60K 2006/4825* (2013.01); *B60K 2006/4833* (2013.01); *F16D 2021/0661* (2013.01)

(58) Field of Classification Search
CPC .. B60K 6/387; B60K 6/48; B60K 2006/4825; B60K 2006/4833
See application file for complete search history.

(56) References Cited

U.S. PATENT DOCUMENTS

| | | | |
|---|---|---|---|
| 2019/0271362 A1 | 9/2019 | Lorenz | |
| 2020/0141453 A1* | 5/2020 | Ebert | ............... F16D 13/58 |

FOREIGN PATENT DOCUMENTS

| | | | | |
|---|---|---|---|---|
| DE | 102015215875 A1 | | 2/2017 | |
| DE | 102016223277 A1 | | 5/2018 | |
| DE | 102017104446 A1 | | 9/2018 | |
| DE | 102017106278 A1 | | 9/2018 | |
| DE | 102017206227 A1 | | 10/2018 | |
| DE | 102017125623 A1 | * | 5/2019 | ............... B60K 6/48 |
| DE | 102018112160 A1 | * | 11/2019 | ............ B60K 6/387 |

OTHER PUBLICATIONS

Machine-assisted English language abstract for DE 10 2015 215 875 extracted from espacenet.com database on Dec. 18, 2019, 4 pages.
Machine-assisted English language abstract for DE 10 2016 223 277 extracted from espacenet.com database on Dec. 18, 2019, 4 pages.
Machine-assisted English language abstract and machine-assisted English translation for DE 10 2017 104 446 extracted from espacenet.com database on Dec. 18, 2019, 12 pages.
English language abstract and machine-assisted English translation for DE 10 2017 106 278 extracted from Bspacenet.com database on Dec. 18, 2019, 10 pages.
Machine-assisted English language abstract and machine-assisted English translation for DE 10 2017 206 227 extracted from espacenet.com database on Dec. 18, 2019, 11 pages.
English language abstract and machine-assisted English translation for DE 10 2012 024 699 extracted from espacenet.com database on Dec. 11, 2019, 22 pages.

* cited by examiner

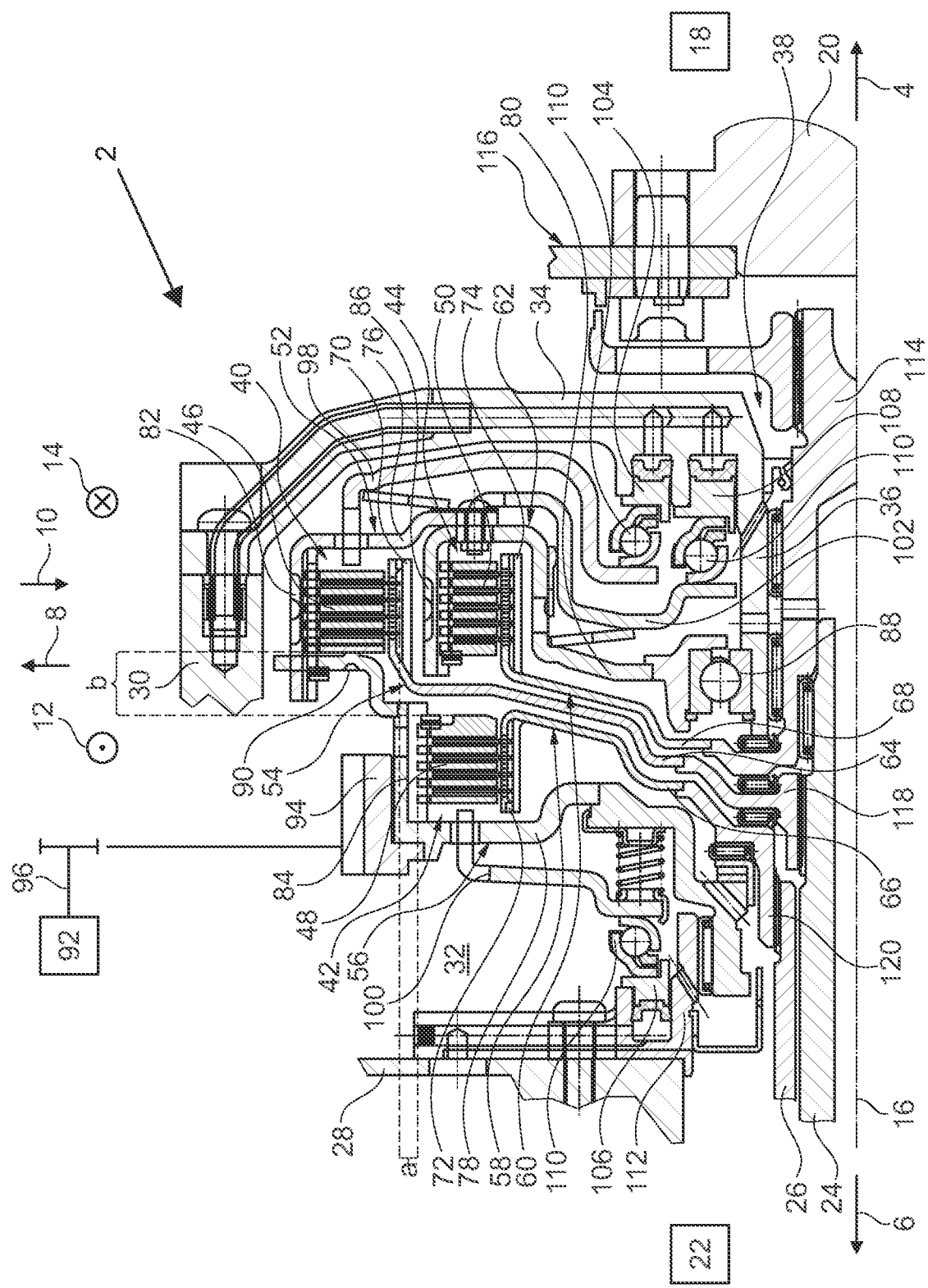

TRIPLE CLUTCH DEVICE AND DRIVETRAIN COMPRISING SUCH A TRIPLE CLUTCH DEVICE

CROSS-REFERENCE TO RELATED APPLICATIONS

This application claims the benefit of German Patent Application No. 102018009253.5 filed Nov. 24, 2018, the disclosure of which is herein incorporated by reference in its entirety.

DESCRIPTION

The present invention relates to a triple clutch device for arrangement in a drivetrain of a motor vehicle having a double clutch device comprising a first disk clutch for selective torque transmission between a first input-side disk carrier and a first output-side disk carrier and a second disk clutch for selective torque transmission between a second input-side disk carrier, which is connected rotationally fixed to the first input-side disk carrier, and a second output-side disk carrier, wherein additionally a separating clutch device is provided comprising a third disk clutch for selective torque transmission between a third input-side disk carrier and a third output-side disk carrier. In addition, the first input-side disk carrier is connected rotationally fixed to the third output-side disk carrier, whereas in addition, a first disk set of the first disk clutch and a third disk set of the third disk clutch are arranged nested in the radial direction. The present invention additionally relates to a drivetrain of a motor vehicle comprising such a triple clutch device.

A triple clutch device is known from DE 10 2012 024 699 A1 for arrangement in a drivetrain of a motor vehicle between a drive unit and a transmission. The triple clutch device has a double clutch device, which is designed as a parallel double clutch device with two disk clutches arranged parallel to each other, thus staggered in the axial direction. The first and second disk clutches thereby have a mutual, input-side disk carrier, wherein the input-side disk carrier additionally forms the output-side disk carrier of a third disk clutch, via which a torque from a drive unit may be selectively transferred to the mutual input-side disk carrier of the first and second disk clutches. The known triple clutch device has proven itself with regards to a compact structure; however, it has a relatively complex actuating device for the third disk clutch. In addition, the known triple clutch device is conceived of in a way that increases manufacturing and assembly costs.

It is therefore one object of the present invention to create a triple clutch device for arrangement in a drivetrain of a motor vehicle, preferably between a drive unit and a double clutch transmission, which has a double clutch device in connection to a separating clutch device, wherein the triple clutch device is to be particularly simply designed while achieving low manufacturing and assembly costs while maintaining a compact design. In addition, the underlying object of the present invention is to create a drivetrain for a motor vehicle with such an advantageous triple clutch device.

This problem is solved by the features listed in patent claim 1 or 10. Advantageous embodiments of the invention are the subject matter of the subclaims.

The triple clutch device according to the invention is conceived of for arrangement in a drivetrain of a motor vehicle, preferably between a drive unit or an internal combustion engine on the one side and a transmission or a double clutch transmission on the other side. The triple clutch device has a double clutch device. The double clutch device comprises a first disk clutch for selective torque transmission between a first input-side disk carrier and a first output-side disk carrier and also a second disk clutch for selective torque transmission between a second input-side disk carrier, which is connected rotationally fixed to the first input-side disk carrier, and a second output-side disk carrier. In addition, the triple clutch device has a separating clutch device. This comprises a third disk clutch for selective torque transmission between a third input-side disk carrier and a third output-side disk carrier, wherein the first input-side disk carrier is connected rotationally fixed to the third output-side disk carrier. In addition, a first disk set of the first disk clutch and a third disk set of the third disk clutch are arranged nested in the radial direction in order to achieve a particularly compact design with respect to the axial installation length of the triple clutch device. In contrast to the triple clutch device known from DE 10 2012 024 699 A1, the third disk set of the third disk clutch is not arranged radially outside of the first disk set of the first disk clutch, but instead radially inside of the first disk set of the first disk clutch. By this means, not only a particularly low axial installation length is achieved, but it has also been shown that by this means the manufacturing and assembly costs are lower.

In one advantageous embodiment of the triple clutch device according to the invention, the second disk clutch has a second disk set.

In one preferred embodiment of the triple clutch device according to the invention, the second disk set is arranged offset radially inwardly with respect to the first disk set. In this way, a low radial extension of the triple clutch device is achieved in the axial area of the second disk set, which may be used in an advantageous way, for example, for linking to an electric machine or to other components within the drivetrain. Even if the triple clutch device is not supposed to be provided with additional components in this area, then a more compact design with respect to the radial extension is created in any case. In this context, it has proven particularly advantageous if the second disk set is arranged offset radially inward with respect to the first disk set while being aligned at least partially with the third disk set in order to achieve a particularly compact design.

In one particularly preferred embodiment of the triple clutch device according to the invention, the second disk set is arranged offset radially inward with respect to the first disk set, while maintaining a spacing in the radial direction and/or in the axial direction between the first and second disk sets, in order to reinforce the previously mentioned advantages of a particularly compact design and also the potential for linking to an electric machine or to other components.

In another advantageous embodiment of the triple clutch device according to the invention, a movable first force application element is assigned to the first disk set, a movable second force application element is assigned to the second disk set, and a moveable third force application element is assigned to the third disk set in order to be able to apply a corresponding actuation force to the mentioned disk set. It is hereby preferred if the force application elements are movable in the axial direction. Furthermore, it has also proven advantageous if the force application elements are hydraulically drivable or driven. The force application element may thereby itself form the hydraulic piston; however, it is preferred if the force application element is designed purely as a force application element, to which a separately designed hydraulic piston is assigned in the case of a hydraulic drive. Regardless of the respective embodiment variant of the force application elements, it has proven to be advantageous if the force application elements are designed as shaped sheet metal parts and/or as one piece.

In one particularly advantageous embodiment of the triple clutch device according to the invention, the first and third force application element may apply an actuating force to the first and third disk set of the first and third disk clutches on the side facing away from the second disk set in order to achieve a most direct and simple actuation in the design. In this context, it has additionally proved advantageous if the second force application element may apply an actuating force to the second disk set of the second disk clutch on the side facing away from the first and third disk set.

In another preferred embodiment of the triple clutch device according to the invention, the force application elements are each hydraulically drivable via a stationary actuating piston. The term "stationary", here and also subsequently, is to be understood in that the corresponding component, in this case an actuating piston, is a component which is not rotatable in the circumferential direction about an axis of rotation, in contrast to other components of the triple clutch device. In this embodiment, the stationary actuating pistons are additionally rotary driving decoupled from the associated force transmission element, wherein this may be carried out via a so-called disengagement bearing or roller bearing. Due to the stationary actuating piston and also the mentioned rotary driving decoupling, the pressure chamber assigned to the actuating piston is not subject to any rotational movement, so that in this embodiment, no centrifugal oil forces occur, which would necessitate a centrifugal oil compensation.

According to another preferred embodiment of the triple clutch device according to the invention, the actuating pistons for the first and third force application element are arranged on a stationary housing cover so that the actuating pistons for the first and third force application element may be assembled or disassembled together with the housing cover, which simplifies assembly and disassembly. In addition, it is preferred in this embodiment if the actuating piston for the second force application element is arranged on a stationary housing, for example, a transmission housing and/or a transmission bell, on which the previously mentioned housing cover is detachably fixed.

In order to achieve a particularly compact design of the triple clutch device, the actuating pistons for the first and third force application element are designed as ring pistons arranged nested in the radial direction.

In order to achieve a particularly secure support of the triple clutch device or at least sections thereof, in another advantageous embodiment of the triple clutch device according to the invention, the previously mentioned housing cover has a support tube on which at least the third output-side disk carrier is supported or supportable in the radial and/or axial direction. The support or supportability is hereby preferably both in the radial and also in the axial direction, particularly as in this way, at least the third output-side disk carrier may be installed, together with the housing cover and, if necessary, other components of the triple clutch device, within the drivetrain of a motor vehicle without parts being able to detach from each other in the context of the installation.

In another advantageous embodiment of the triple clutch device according to the invention, the first input-side disk carrier and the third output-side disk carrier, preferably also the second input-side disk carrier, are designed as outer disk carriers.

In another preferred embodiment of the triple clutch device according to the invention, the first input-side disk carrier and the third output-side disk carrier have a mutual radial section, starting from which a disk support section of the first input-side disk carrier and a disk support section of the third output-side disk carrier extend in the same axial direction while being radially nested. By this means, a particularly simple and space-saving design is created, which additionally enables a simple assembly of the triple clutch device.

In another particularly advantageous embodiment of the of the triple clutch device according to the invention, the first input-side disk carrier and the third output-side disk carrier are supported or supportable in the radial direction via a mutual radial support section. It is hereby preferred if the first input-side disk carrier is in rotary driving connection with the third output-side disk carrier or is fixed to the same in such a way that the first input-side disk carrier is equally supported or supportable in the radial direction via the radial support section of the third output-side disk carrier, which consequently forms the mutual radial support section, so that a particularly simple and compact design is created. It is additionally preferred in this embodiment if the support via the mutual radial support section in the radial direction is carried out on a stationary component, for example, on the previously mentioned housing cover or the previously mentioned support tube of the housing cover. It has additionally proven advantageous if the support via the mutual radial support section is additionally carried out via a roller bearing.

To further simplify the installation or the assembly or disassembly of the triple clutch device in another advantageous embodiment of the invention, the disk support section of the first input-side disk carrier is connected rotatably fixed and detachably connected to a disk support section of the second input-side disk carrier, wherein a most direct rotary driving connection is achieved hereby, which additionally enables a compact and space-saving design. The connection between the disk support sections of the first input-side disk carrier and of the second input-side disk carrier is hereby preferably carried out by means of a connection piece, which is detachably in rotary driving engagement with the disk support section of the first input-side disk carrier and/or is detachably in rotary driving engagement with the disk support section of the second input-side disk carrier. Basically, the mentioned connection piece, which is preferably designed as a sheet metal part, is thus also designed as one-piece with one of the two mentioned disk carriers; however, it is advantageous if the mentioned connection part is arranged both detachably on the one and also detachably on the other disk support section in order to achieve more compact individual parts and to be able to carry out the assembly in a more flexible way.

In another advantageous embodiment of the triple clutch device according to the invention, the previously mentioned connection part is designed in such a way that the first disk set is supported or supportable in the axial direction on the connection part, in order to grant the connection part with an additional supporting function which makes an additional or separately designed support part expendable and thus simplifies the design of the triple clutch device.

In order to guarantee a space-saving arrangement in the case of a drivetrain for a hybrid vehicle, in another advantageous embodiment of the triple clutch device according to the invention, the rotor of an electric machine and/or a means for achieving a rotary driving connection with the output side of an electric machine is arranged rotationally fixed on the disk support section of the second input-side disk carrier. The mentioned means is preferably a gear or a sprocket. In order to achieve a particularly compact design in this embodiment, the rotor or the means is preferably arranged aligned in the axial direction with the first disk set and/or nested in the radial direction with the second disk set.

In another advantageous embodiment of the triple clutch device according to the invention, the first output-side disk carrier, the second output-side disk carrier, and the third input-side disk carrier are designed as inner disk carriers which each have a radial support section and a disk support section, wherein the radial support section extends substantially in the radial direction while the disk support section extends substantially in the axial direction and functions for the rotationally fixed accommodation of the associated disks. The disk support sections of the first output-side disk carrier and of the third output-side disk carrier thereby extend starting from the respective or assigned radial support section, while being radially nested themselves, in the same axial direction, by which means a particularly easy equipping of the inner disk carrier with the assigned disks or inner disks is ensured. It is additionally preferred in this embodiment if the disk support section of the second output-side disk carrier extends, starting from the assigned radial support section, in the opposite axial direction in order to simplify assembly and design of the triple clutch device. It has additionally proven advantageous in this context if the radial support sections follow each other directly in the axial direction at least in sections, thus at least in certain radial sections, so that if necessary a clearance is arranged between the same in order to achieve a particularly simple and compact design.

The drivetrain according to the invention for a motor vehicle, in particular for a hybrid vehicle, has an embodiment of the previously described triple clutch device.

In one preferred embodiment of the drivetrain according to the invention, the third input-side disk carrier is directly or indirectly in rotary driving connection with an output side of an internal combustion engine, while an output side of an electric machine is in rotary driving connection with the second input-side disk carrier, preferably with the previously mentioned disk support section of the second input-side disk carrier, in order to create a particularly simple and compactly designed drivetrain for a hybrid vehicle.

In one advantageous embodiment of the drivetrain according to the invention, the first output-side disk carrier is in rotary driving connection with a first transmission input shaft, and the second output-side disk carrier is in rotary driving connection with a second transmission input shaft, wherein the two mentioned transmission input shafts are preferably transmission input shafts of a double clutch transmission. It is also preferred in this embodiment if the first and second transmission input shafts are arranged nested in the radial direction so that at least one of the two transmission input shafts is designed as a hollow shaft through which the other transmission input shaft extends. A particularly compact design is also hereby achieved.

The invention will be subsequently described in greater detail with the aid of one exemplary embodiment with reference to the appended drawing. The single FIGURE shows a side view of one embodiment of a triple clutch device inside of a drivetrain of a motor vehicle in a sectional depiction.

The single FIGURE shows a triple clutch device 2 within a drivetrain of a motor vehicle, wherein the opposite axial directions 4, 6, the opposite radial directions 8, 10, and the opposite circumferential directions 12, 14 are indicated by way of corresponding arrows and triple clutch device 2 is rotatable in circumferential directions 12, 14 about a central axis of rotation 16 which extends in axial directions 4, 6.

Triple clutch device 2 is arranged inside of a drivetrain between an internal combustion engine 18, of which at least output side 20 of the crankshaft is indicated, and a transmission 22, here a double clutch transmission, wherein a first transmission input shaft 24, a second transmission input shaft 26, and a housing 28 are shown of transmission 22. The two transmission input shafts 24, 26 are arranged nested in radial direction 8, 10, wherein second transmission input shaft 26 is designed substantially as a hollow shaft, through which first transmission input shaft 24 extends in axial direction 4, 6. Housing 28 of transmission 22 has a housing bell 30, open in axial direction 4, said housing bell delimits a wet space 32 in axial direction 6 and outwardly in radial direction 8, wherein housing bell 30 or wet space 32 is closed in axial direction 4 by a housing cover 34 detachably fixed on housing bell 30. Inwardly in radial direction 10, housing cover 34 has a support tube 36, which extends in radial direction 6 into wet space 32 and surrounds an opening 38 in housing cover 34.

Triple clutch device 2, arranged within wet space 32, has a double clutch device which is composed of a first disk clutch 40 and a second disk clutch 42. In addition, triple clutch device 2 has a separating clutch device with a third disk clutch 44. Consequently, first, second, and third disk clutches 40, 42, 44 have a first disk set 46, and second disk set 48, and a third disk set 50.

First disk clutch 40 has a first input-side disk carrier 52 and a first output-side disk carrier 54. Second disk clutch 42 has, in contrast, a second input-side disk carrier 56 and a second output-side disk carrier 58. Thus, first disk clutch 40 functions for selective torque transmission between first input-side disk carrier 52 and first output-side disk carrier 54, while second disk clutch 42 of the double clutch device functions for selective torque transmission between second input-side disk carrier 56 and second output-side disk carrier 58, wherein first input-side disk carrier 52 and second input-side disk carrier 56 are connected rotationally fixed to each other, which will be discussed again later in greater detail.

In contrast, a third input-side disk carrier 60 and a third output-side disk carrier 62 are assigned to third disk clutch 44 of the separating clutch device, wherein first input-side disk carrier 52 is connected rotationally fixed to third output-side disk carrier 62 so that third disk clutch 44 functions for the selective torque transmission between third input-side disk carrier 60 on the one side and third output-side disk carrier 62 or first input-side disk carrier 52 on the other side.

First input-side disk carrier 52, second input-side disk carrier 56, and third output-side disk carrier 62 are designed as outer disk carriers, while first output-side disk carrier 54, second output-side disk carrier 58, and third input-side disk carrier 60 are designed as inner disk carriers. Disk carriers 60, 54, 58, designed as inner disk carriers, each have a radial support section 64, 66, 68 extending substantially in radial directions 8, 10 and a tubular disk support section 70, 72, 74 extending substantially in axial directions 4, 6, wherein respective disk support sections 70, 72, or 74 connect outwardly in radial direction 8 to associated radial support sections 64, 66, or 68. As is clear from the FIGURE, disk support sections 70, 74 of first output-side disk carrier 54 and of third input-side disk carrier 60 extend, starting from associated radial support section 64, 68, in the same axial direction 4 due to the radial nesting of both disk support sections 70, 74. Disk support section 72 of second output-side disk carrier 58 extends, in contrast, starting from associated radial support section 66 in opposite axial direction 6. Radial support sections 68, 64, 66, following one another in axial direction 6, are thereby arranged in a particularly space-saving way with respect to the axial installation space, in that radial support sections 68, 64, 66 directly follow one another, at least in one radial section, in axial directions 4, 6, so that if necessary, there is a free space between the same; however, no other component of triple clutch device 2 is arranged there.

Disk carriers 52, 56, 62, designed as outer disk carriers, likewise each have a radial support section 76, 78, 80, which extend substantially in radial directions 8, 10, wherein a disk support section 82, 84, 86, extending substantially in axial directions 4, 6, respectively connects to radial support section 76, 78, 80. Disk support sections 82, 84, 86 also connect outwardly in radial direction 8 to associated radial support sections 76, 78, 80 and are designed as substantially tubular. Radial support section 76 is thereby connected rotationally fixed to radial support section 80 in order to achieve the previously mentioned rotary driving connection between first input-side disk carrier 52 and third output-side disk carrier 62, wherein the connection is carried out here, for example, via a riveted connection. Consequently, third output-side disk carrier 62 and first input-side disk carrier 52 form a substantially F-shaped double disk carrier. Thus, the two disk carriers 52 and 62 have a mutual radial section formed by radial support sections 80 and 76, from which both disk support section 82 and also disk support section 86 extend starting in axial direction 6, wherein this is carried out within the radial nesting of both disk support sections 82, 86. Radial support section 76 of first input-side disk carrier 52 also extends merely up to radial support section 80 of third output-side disk carrier 62, in order to be fixed to the same and be supported in radial directions 8, 10, so that the section of radial support section 80 lying inward in radial direction 10 forms a mutual radial support section for third output-side disk carrier 62 and first input-side disk carrier 52 equally. First input-side disk carrier 52 and third output-side disk carrier 62 are thus supported or supportable in radial directions 8, 10 via this mutual radial support section 80. The support of mutual radial support section 80 is carried out on a stationary component, stated more precisely support tube 36 of housing cover 34, particularly as both housing 28 and also housing cover 34 are designed as stationary in the sense that they do not rotate about axis of rotation 16. The support is also not carried out directly, but instead via a roller bearing 88 between radial support section 80 or a hub fixed thereon and support tube 36.

In addition, radial support section 80 is supported in radial directions 8, 10 on support tube 36 in such a way that disk carriers 52 and 62 are arranged captively on housing cover 34 and consequently, considered in isolation with housing cover 34, may not be detached from housing cover 34 in axial direction 6 before—as shown here by way of example—a corresponding retaining ring is detached. In general, it may be stated that radial support section 80 of third output-side disk carrier 62 is captively supported or supportable both in radial directions 8, 10 and also in axial directions 4, 6.

As already previously mentioned, first input-side disk carrier 52 and second input-side disk carrier 56 are connected rotationally fixed to each other. This rotationally fixed connection is achieved in the embodiment depicted via a connection part 90, which connects disk support section 82 of first input-side disk carrier 52 rotationally fixed and detachably to disk support section 84 of second input-side disk carrier 56 so that first input-side disk carrier 52 and second input-side disk carrier 56 are detachable from each other. Connection part 90 is thereby detachably in rotary driving engagement with disk support section 82 of first input-side disk carrier 52 on the one side and on the other side detachably in rotary driving engagement with disk support section 84 of second input-side disk carrier 56, wherein connection part 90 preferably engages at the mentioned disk support sections 82, 84 without an existing rotary driving contour. In addition, connection part 90 is fixed on disk support section 82 of first input-side disk carrier 52 in axial direction 6 via a retaining ring, while first disk set 46 is supported or supportable in axial direction 6 on connection part 90 supported in this way. As connection part 90 extends directly between both disk support section 82 and 84, without being supported elsewhere in radial directions 8, 10, a particularly compact design is achieved here.

First disk set 46 of first disk clutch 40 is arranged nested in radial directions 8, 10 with third disk set 50 of third disk clutch 44, wherein the presence of an axial overlapping area between both disk sets 46, 50 may be discussed. However, first disk set 46 is thereby not arranged within third disk set 50 in radial direction 10; instead, first and third disk sets 46, 50 are radially nested in such a way that third disk set 50 of third disk clutch 44 of the separating clutch device is arranged in radial direction 10 within first disk set 46 of first disk clutch 40 of the double clutch device. Second disk set 48 of second disk clutch 42 is additionally arranged inwardly in radial direction 10, offset with respect to first disk set 46 of first disk clutch 40. The mentioned offset is thereby so large that second disk set 48 is arranged at least partially aligned in axial directions 4, 6 with third disk set 50 of third disk clutch 44 on the one hand. On the other hand, a spacing a in radial directions 8, 10 and a spacing b in axial directions 4, 6 are achieved between first disk set 46 and second disk set 48. Consequently, the double clutch device, made of first and second disk clutches 40, 42, is neither a parallel double clutch device, in which disk sets 46, 48 would be aligned with each other in axial directions 4, 6, nor is it a concentric double clutch device, in which first and second disk sets 46, 48 would be arranged nested with each other in radial directions 8, 10.

Due to the previously described arrangement of the disk sets, disk support section 84 of second input-side disk carrier 56 is also offset inwardly in radial direction 10 with respect to disk support section 82 of first input-side disk carrier 52 so that in this axial section, an installation space for linking to an electric machine 92 is created in an advantageous way. As is clear from the FIGURE, means 94 for achieving a rotary driving connection with output side 96 of electric machine 92 is arranged rotationally fixed on disk support section 84 of second input-side disk carrier 56 for this purpose. The mentioned means 94 may be, for example, a gear or a sprocket or a cog or a sprocket wheel. Due to the installation space created, means 94 is arranged aligned with first disk set 46 in axial directions 4, 6. In addition, means 94 is arranged nested with second disk set 48 in radial directions 8, 10, wherein this ensures a particularly compact design of triple clutch device 2. Instead of means 94 shown here, a rotor of electric machine 92 may also be arranged rotationally fixed directly on disk support section 84 of second input-side disk carrier 56, wherein such a rotor would then be arranged aligned with first disk set 46 in axial directions 4, 6 and nested with second disk set 48 in radial directions 8, 10.

First, second, and third force application elements 98, 100, 102, which are movable in axial directions 4, 6 and hydraulically drivable or driven, are respectively assigned to first, second, and third disk sets 46, 48, 50. Force application elements 98, 100, 102 are preferably sheet metal parts or shaped sheet metal parts. First force application element 98 and third force application element 102 are thereby arranged in axial direction 4 next to radial support sections 76, 80 and between the same and housing cover 34. Consequently, force application elements 98, 102 are likewise arranged captively on housing cover 34, after third output-side disk carrier 62 is fixed in axial direction 4, 6, in particular in axial directions 6, via roller bearing 88 and a corresponding retaining ring.

First disk set 46 and third disk set 50 are on the side facing away from second disk set 48, consequently on the side facing in axial direction 4, and an actuating force may be applied by first force application element 98 or third force application element 102, said actuating force consequently acting in axial direction 6 in each case. Both first and also third force application elements 98, 102 thereby have actuating fingers, which extend through windows in radial support section 76 or 80 in order to be able to interact with the side of first disk set 46 or of third disk set 50 facing in axial direction 4. In contrast, second force application element 100 is arranged in axial direction 6 next to radial support section 78 of second input-side disk carrier 56, wherein second force application element 100 applies an actuating force, which acts in axial direction 4, on second disk set 48 on the side facing first and second disk sets 46, 50, consequently on the side facing in axial direction 6. Corresponding actuating fingers are also provided on second force application element 100 for this purpose, said actuating fingers extend in axial direction 4 through windows in radial support section 78 of second input-side disk carrier 56 in order to interact with second disk set 48.

Force application elements 98, 100, 102 are respectively hydraulically drivable via a stationary actuating piston 104, 106, 108, which is rotary driving decoupled from the associated force application element 98, 100, 102 via corresponding engagement bearings 110. A stationary actuating piston 104, 106, 108 is to be understood here as an actuating piston which is not rotated about axis of rotation 16. Actuating pistons 104 and 108 for first and third force application elements 98, 102 are arranged on stationary housing cover 34, wherein the pressure chambers assigned to actuating pistons 104, 108 and also the conduits leading into the pressure chambers are designed within housing cover 34. In contrast, actuating piston 106 for second force application element 100 is arranged on the opposite part of housing 28, consequently on a section of housing bell 30, wherein the pressure chamber assigned to actuating piston 106 and also the conduits leading into the pressure chamber are designed within an additional housing 112, which is in turn fixed on housing 28—preferably detachably. Actuating pistons 104, 108 are additionally designed as ring pistons arranged nested in radial directions 8, 10.

Within the drivetrain, third input-side disk carrier 60 is connected rotationally fixed, yet detachably, directly or indirectly via an input hub 114, to output side 20 of internal combustion engine 18. In the embodiment shown, an indirect connection is provided via a torsional vibration damper 116, of which at least the primary element, rotationally fixed on output side 20, and the secondary element, in rotary driving engagement with input hub 114, are indicated, wherein the primary element and secondary element are torsionally elastically coupled to each other in a conventional way. In contrast, output side 96 of electric machine 92 is in rotary driving connection with second input-side disk carrier 56, wherein this—as already previously described—may be carried out by means 94 or a rotor of electric machine 92 fixed directly on second input-side disk carrier 56. In addition, a first output hub 118 or a second output hub 120 is fixed rotationally fixed at the ends of radial support sections 64 or 66 of first output-side disk carrier 54 or of second output-side disk carrier 58 facing inward in radial direction 10, wherein first output hub 118 is in rotationally fixed, yet detachable, rotary driving engagement with first transmission input shaft 24, while second output hub 120 is in rotationally fixed, yet detachable, rotary driving engagement with second transmission input shaft 26.

REFERENCE NUMERALS

2 Triple clutch device
4 Axial direction
6 Axial direction
8 Radial direction
10 Radial direction
12 Circumferential direction
14 Circumferential direction
16 Axis of rotation
18 Internal combustion engine
20 Output side
22 Transmission
24 First transmission input shaft
26 Second transmission input shaft
28 Housing
30 Housing bell
32 Wet space
34 Housing cover
36 Support tube
38 Opening
40 First disk clutch
42 Second disk clutch
44 Third disk clutch
46 First disk set
48 Second disk set
50 Third disk set
52 First input-side disk carrier
54 First output-side disk carrier
56 Second input-side disk carrier
58 Second output-side disk carrier
60 Third input-side disk carrier
62 Third output-side disk carrier
64 Radial support section
66 Radial support section
68 Radial support section
70 Disk support section
72 Disk support section
74 Disk support section
76 Radial support section
78 Radial support section
80 Radial support section
82 Disk support section
84 Disk support section
86 Disk support section
88 Roller bearing
90 Connection piece
92 Electric machine
94 Means
96 Output side
98 First force application element
100 Second force application element 102 Third clutch actuation device
104 Actuating piston
106 Actuating piston
108 Actuating piston
110 Engagement bearing
112 Additional housing
114 Input hub
116 Torsional vibration damper
118 First output hub
120 Second output hub
a Spacing
b Spacing

The invention claimed is:

1. A triple clutch device (2) for arrangement in a drivetrain of a motor vehicle having a double clutch device comprising a first disk clutch (40) for selective torque transmission between a first input-side disk carrier (52) and a first output-side disk carrier (54) and a second disk clutch (42) for selective torque transmission between a second input-side disk carrier (56), which is connected rotationally fixed to the first input-side disk carrier (52), and a second output-side disk carrier (58), and having a separating clutch device comprising a third disk clutch (44) for selective torque transmission between a third input-side disk carrier (60) and a third output-side disk carrier (62), wherein the first input-side disk carrier (52) is connected rotationally fixed to the third output-side disk carrier (62), and a first disk set (46) of the first disk clutch (40) and a third disk set (50) of the third disk clutch (44) are arranged nested in the radial directions (8, 10), characterized in that the third disk set (50) is arranged within the first disk set (46) in the radial direction (10), characterized in that the first output-side disk carrier (54), the second output-side disk carrier (58), and the third input-side disk carrier (60) are designed as inner disk carriers with a respective radial support section (64, 66, 68) and a disk support section (70, 72, 74), wherein the disk support sections (70, 74) of the first output-side disk carrier and the third input-side disk carrier (54, 60) extend starting from the respective radial support section (64, 68) in the same axial direction (4) while being radially nested and
   characterized in that the second disk clutch (42) has a second disk set (48), wherein the second disk set (48) is arranged offset inwardly in the radial direction (10) with respect to the first disk set (46).

2. The triple clutch device (2) according to claim 1, characterized in that hydraulically drivable or driven first, second, and third force application element (98, 100, 102) is assigned to the first, second, and third disk set (46, 48, 50), wherein an actuating force may be applied by the first and third force application elements (98, 102) to the first and third disk sets (46, 50), on the side facing away from the second disk set (48), while an actuating force may be applied by the second force application element (100) to the second disk set (48), on the side facing away from the first and third disk sets (46, 50).

3. The triple clutch device (2) according to claim 2, characterized in that the force application elements (98, 100, 102) are each hydraulically drivable via a stationary actuating piston (104, 106, 108) which is rotary driving decoupled from the associated force application element (98, 100, 102), wherein the actuating pistons (104, 108) for the first and third force application elements (98, 102) are arranged on a stationary housing cover (34) and the actuating piston (106) for the second force application element (100) is arranged on a stationary housing (28), on which the housing cover (34) is detachably fixed.

4. The triple clutch device (2) according to claim 3, characterized in that the actuating pistons (104, 108) for the first and third force application elements (98, 102) are designed as ring pistons arranged nested in the radial directions (8, 10), and/or the housing cover (34) has a support tube (36) on which at least the third output-side disk carrier (62) is supported or supportable in the radial and/or axial directions (8, 10; 4, 6).

5. The triple clutch device (2) according to claim 4, characterized in that the second input-side disk carrier (56), is designed as an outer disk carrier, wherein the first input-side disk carrier (52) and the third output-side disk carrier (62) are supported or supportable in the radial directions (8, 10) via a mutual radial support section (80).

6. The triple clutch device (2) according to claim 5, characterized in that the mutual radial support section (80) is a stationary component or the housing cover (34) or the support tube (36) of the housing cover (34) and/or a roller bearing (88).

7. The triple clutch device (2) according to claim 3, characterized in that the first input-side disk carrier (52) and the third output-side disk carrier (62), are designed as outer disk carriers, wherein the first input-side disk carrier (52) and the third output-side disk carrier (62) have a mutual radial section, starting from which a disk support section (82) of the first input-side disk carrier (52) and a disk support section (86) of the third output-side disk carrier (62) extend in the same axial direction (6) while being radially nested.

8. The triple clutch device (2) according to claim 7, characterized in that the disk support section (82) of the first input-side disk carrier (52) is connected rotationally fixed and detachably to a disk support section (84) of the second input-side disk carrier (56), by a connection part (90) which is in detachable rotary driving engagement with the disk support section (82) of the first input-side disk carrier (52) and/or is in detachable rotary driving engagement with the disk support section (84) of the second input-side disk carrier (56).

9. The triple clutch device (2) according to claim 8, characterized in that the rotor of an electric machine (92) or a means (94) for achieving a rotary driving connection with the output side (96) of an electric machine (92) is arranged rotationally fixed on the disk support section (84) of the second input-side disk carrier (56).

10. The triple clutch device (2) according to claim 9, characterized in that the rotor or the means (94) is arranged aligned with the first disk set (46) in the axial directions (4, 6) and/or nested with the second disk set (48) in the radial directions (8, 10).

11. The triple clutch device (2) according to claim 9, characterized in that the means (94) is a gear or sprocket.

12. The triple clutch device (2) according to claim 8, characterized in that the first disk set (46) is supported or supportable in the axial direction (6) on the connection part (90).

13. A drivetrain for a motor vehicle comprising a triple clutch device (2) according to claim 1, wherein the third input-side disk carrier (60) is in direct or indirect rotary driving connection with an output side (20) of an internal combustion engine (18) and an output side (96) of an electric machine (92) is in rotary driving connection with the second input-side disk carrier (56).

14. The drivetrain for a motor vehicle according to claim 13, characterized in that the first output-side disk carrier (54) is in rotary driving connection with a first transmission input shaft (24) and the second output-side disk carrier (58) is in rotary driving connection with a second transmission input shaft (26).

15. The drivetrain for a motor vehicle according to claim 14, characterized in that the first and second transmission input shafts (24, 26) are arranged nested in the radial direction (8 10).

16. The triple clutch device (2) according to claim 1, characterized in that the disk support section (72) of the second output-side disk carrier (58) extends in the opposite axial direction (6) starting from the associated radial support section (66).

17. The triple clutch device (2) according to claim 1, characterized in that the radial support sections (64, 66, 68) directly follow each other at least in sections in the axial directions (4, 6).

18. The triple clutch device (2) according to claim 1, characterized in that the second disk set (48) is arranged at least partially aligned with the third disk set (50) in the axial direction (4, 6) and/or while achieving a spacing (a; b) in the radial direction (8, 10) and/or in the axial direction (4, 6) between the first and second disk sets (46, 48).

\* \* \* \* \*